United States Patent
van Grinsven et al.

(10) Patent No.: US 9,529,702 B2
(45) Date of Patent: Dec. 27, 2016

(54) SYSTEM TO ENABLE MULTI-TENANCY TESTING OF BUSINESS DATA AND VALIDATION LOGIC ON THE CLOUD

(71) Applicant: Oracle International Corporation, Redwood Shores, CA (US)

(72) Inventors: Ronald van Grinsven, Santa Clara, CA (US); Nagarajender Rao Katoori, Hyderabad (IN); Mahesh Bansal, Hisar (IN); Namita Varma, Noida (IN); Shailesh Jain Vinayaka, Los Gatos, CA (US); John Richard Smiljanic, Austin, TX (US); Michael John De Groot, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 14/596,191

(22) Filed: Jan. 13, 2015

(65) Prior Publication Data

US 2016/0203074 A1    Jul. 14, 2016

(51) Int. Cl.
*G06F 11/00* (2006.01)
*G06F 11/36* (2006.01)
*G06F 9/445* (2006.01)

(52) U.S. Cl.
CPC ............ *G06F 11/3688* (2013.01); *G06F 8/61* (2013.01)

(58) Field of Classification Search
USPC ................................................ 714/2, 25, 33
See application file for complete search history.

(56) References Cited

U.S. PATENT DOCUMENTS

| | | | | | |
|---|---|---|---|---|---|
| 6,091,802 | A | * | 7/2000 | Smith | .................... H04M 3/323 379/1.03 |
| 2004/0255291 | A1 | * | 12/2004 | Sierer | ....................... G06F 8/61 717/174 |
| 2006/0129891 | A1 | * | 6/2006 | Padisetty | ............ G06F 11/3688 714/38.14 |
| 2006/0178858 | A1 | * | 8/2006 | Trowbridge | .............. G06F 8/34 703/2 |
| 2013/0159772 | A1 | * | 6/2013 | Felton | ................. G06F 11/3624 714/32 |

* cited by examiner

*Primary Examiner* — Sarai Butler
(74) *Attorney, Agent, or Firm* — Kilpatrick Townsend & Stockton LLP

(57) ABSTRACT

An adapter can execute a test script in parallel relative to separate tenant installations in a multi-tenant environment. Such tenant installations can be established within a cloud computing environment. Multiple tenant installations may share some installation components, such as an application server and/or a database, so that these shared installation components are not duplicated. While executing the test script in parallel, the adapter can translate selected values for each test script execution so that those values are distinguished from corresponding values within other test script executions. The values can be translated to reflect the identity of the tenant whose installation the test script execution targets. Furthermore, while executing the test scripts in parallel, the adapter can cause the test script executions to synchronize at specified points within the test script, so that all of the test script executions are guaranteed to have executed to a common point before proceeding.

20 Claims, 6 Drawing Sheets

SYSTEM TO ENABLE MULTI-TENANCY TESTING OF BUSINESS DATA AND VALIDATION LOGIC ON THE CLOUD

BACKGROUND

The disclosure pertains to software testing techniques, and more particularly to testing software that executes within a cloud computing environment. A client-server environment involves a client computing device that sends requests to a server computing device. The server receives these requests, processes these requests, and returns results of the processing to the client. Often, these requests are transmitted through one or more networks, potentially including the Internet. The client in such an environment may be a web client, which sends requests through the world wide web to a web server.

Requests received over the world wide web from a web client can be processed by applications executing on an application server. The applications—computer programs—executing on the application server can process the requests using the facilities of a database. The database can store and retrieve data used in the processing of the requests and the generation of the results. In some scenarios, such an application server and database can be installed upon a set of computing nodes within a cloud computing environment. The combination of the installed application server (including the applications that execute upon it) and database therefore may be called an "installation."

In a cloud computing environment, the computing nodes and the software programs that execute upon those nodes typically are not owned by the users of those software programs. Sometimes, the hardware and software resources resident within a cloud computing environment are shared by many different users. These users might be entirely unrelated to each other.

The users of the resources of a cloud computing environment can be separate customers—separate business organizations, for example. Usually, such customers require that their business data be maintained in a private manner such that no other customers can access that data as it is stored in the cloud computing environment. A cloud computing environment may include mechanisms for enforcing isolation between the data, and even the applications, used by different customers. This enforced isolation prevents one customer from reading another customer's data or updating another customer's data, even if both customers are users of the same cloud computing environment.

One approach for enforcing isolation between customers is by requiring each customer to have a completely separate installation within the cloud computing environment. Under this approach, a first installation of an application server and database upon a set of cloud computing nodes may serve a first customer only, while a second installation of the application server and database upon a set of cloud computing nodes may serve a second customer only. The application server in the first installation (and the applications executing thereon) might be configured to access data only from the database in the first installation. Similarly, the application server in the second installation (and the applications executing thereon) might be configured to access data only from the database in the second installation. Customers may be prevented from altering these configurations.

A designer of any of the components of an installation naturally will want to ensure that the component that he has designed functions properly. A malfunction might produce severe consequences, especially in a cloud computing environment. If a component of an installation does not function correctly—for example, if a component is erroneously permitted to access components of other installations—then the malfunction could result in the privacy of other customers' data being compromised. Such data might include credit card numbers, photographs, or other highly sensitive information.

To ensure that the components of an installation are functioning as intended, and that they are functioning properly in their interactions with other components of that installation, a designer can execute tests relative to an installation. These tests may involve the automated performance of operations specified in a test script, for example. Execution of the operations by components of an installation may involve the reading and updating of data stored in the database of the installation. Following the execution of a series of operations, a test script can cause a particular value to be read from the database and compared to an expected value. If the particular value does not match the expected value, then some error likely afflicts some component of the installation.

Approaches for testing an installation have so far been limited to the testing of single installations in isolation of others that might also exist, potentially on the same cloud computing nodes within a cloud computing environment. These approaches assume that testing performed relative to one installation will have equal value to that same testing being performed relative to other identical installations that also might exist in the cloud computing environment.

BRIEF SUMMARY

According to some embodiments, an adapter can execute a test script in parallel relative to separate tenant installations in a multi-tenant environment. Such tenant installations can be established within a cloud computing environment, for example. Multiple tenant installations may share some installation components, such as an application server and/or a database, so that these shared installation components are not duplicated for each installation. While executing the test script in parallel, the adapter can translate selected values for each test script execution so that those values are distinguished from corresponding values within other test script executions. The values can be translated to reflect the identity of the tenant whose installation the test script execution targets. Furthermore, while executing the test scripts in parallel, the adapter can cause the test script executions to synchronize at specified synchronization points within the test script, so that all of the test script executions are guaranteed to have executed to a same synchronization point before proceeding.

DETAILED DESCRIPTION

Figure 1:
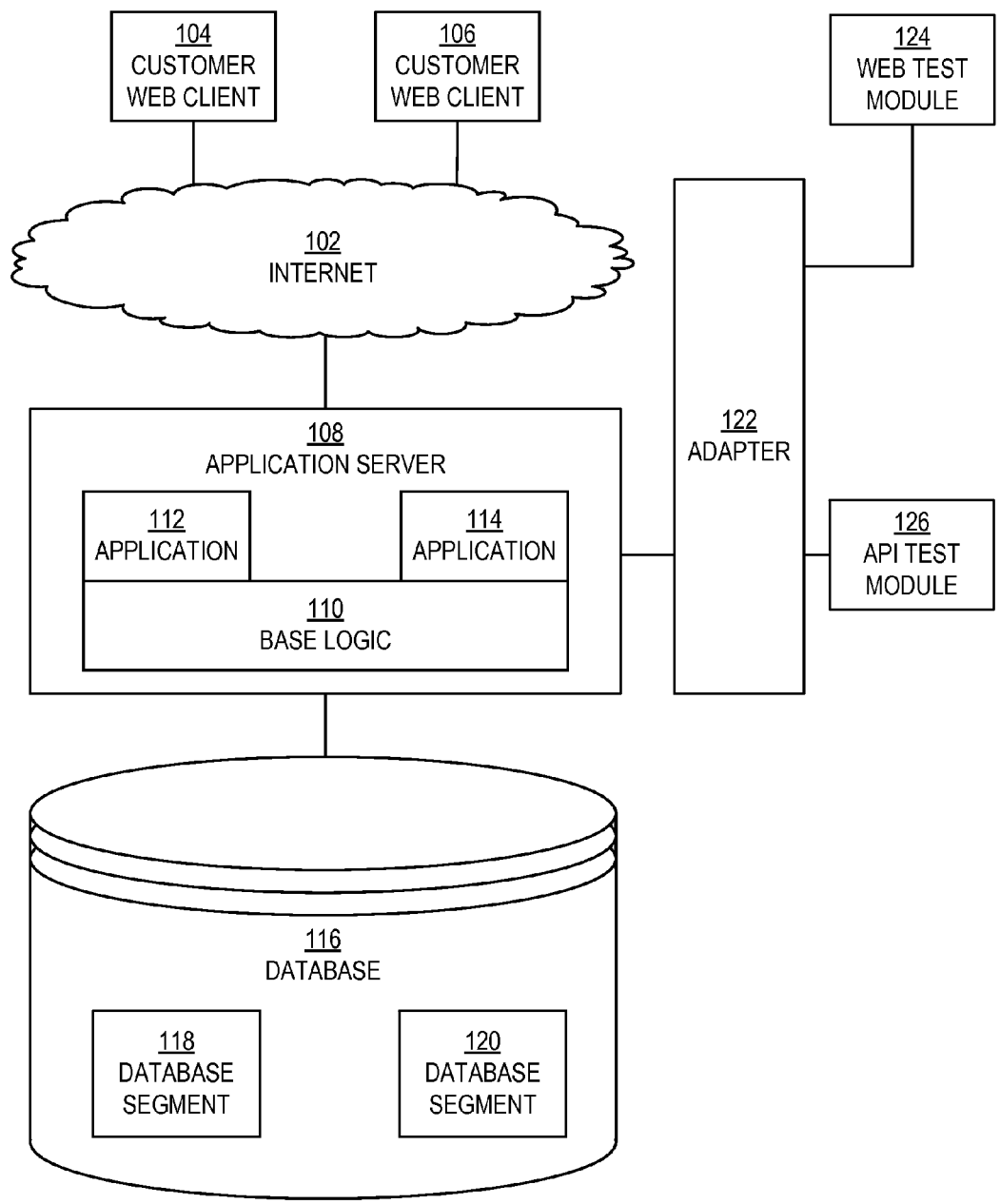
FIG. 1 is a block diagram that illustrates an example of a test system that includes an adapter for adapting test scripts designed for single installations to execute relative to multiple tenant installations, according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

According to some embodiments, an adapter can execute a test script in parallel relative to separate tenant installations in a multi-tenant environment. Such tenant installations can be established within a cloud computing environment, for example. Multiple tenant installations may share some installation components, such as an application server and/or a database, so that these shared installation components are not duplicated for each installation. While executing the test script in parallel, the adapter can translate selected values for each test script execution so that those values are distinguished from corresponding values within other test script executions. The values can be translated to reflect the identity of the tenant whose installation the test script execution targets. Furthermore, while executing the test scripts in parallel, the adapter can cause the test script executions to synchronize at specified synchronization points within the test script, so that all of the test script executions are guaranteed to have executed to a same synchronization point before proceeding.

Complexities Affecting Testing in a Multi-Tenant Environment

In a multi-tenant system, each customer, or tenant, can have its own installation that is supposed to be isolated functionally from the installations of all other tenants in a cloud computing environment. Even though the installations of various tenants are isolated functionally from each other in the multi-tenant system, some components of the installations may be shared by multiple tenants in order to avoid wasteful duplication.

For example, the installations of multiple different tenants may share the same database. The database may include separate segments, or containers, for different tenants. One tenant's data may be stored within one segment, while another tenant's data may be stored within another segment within the same database. The database can be configured to prevent one tenant's segment from being accessed by another tenant that uses the same database. Each segment can be accessed through a separate database connection, essentially making each segment appear to a tenant to be an entirely separate database.

For another example, the installations of multiple different tenants may share the same application server. The base application server logic may be shared by the applications of multiple different tenants, so that this logic does not need to be replicated wastefully for each tenant. Multiple applications executing on the application server can make use of the same base application server logic. These multiple applications can include applications that belong to the installations of different tenants, such that one application using the base application server logic belongs to the installation of one tenant, while another application using the same base application server logic belongs to the installation of another tenant. The application server can be configured to prevent one tenant's applications from being accessed by another tenant that uses the same application server.

Under some scenarios, even the applications that execute on an application server can be shared by multiple tenants. A single process executed based on a particular application's binary file can be accessed by different tenants as part of those tenants' installations. An application having the capacity to distinguish between different tenants is called a multi-tenant application. A multi-tenant application is configured to prevent one tenant's access from influencing any other tenant's installation and data.

The sharing of installation components such as databases and applications servers among multiple tenants beneficially can reduce the burden upon system administrators of those components. One administrator can administer a shared application server, while another administrator can administer a shared database. Separate administrators for separate application servers and databases—one for each tenant installation—can be avoided.

A test script can be executed relative to an installation within a cloud computing environment in a variety of different ways. One way of executing the test script involves executing the test script directly relative to an application that executes on an application server. Such a test script may instruct the application to perform operations in a manner similar to the way in which a web client might instruct that application to perform operations under non-test scenarios. Another way of executing the test script involves executing the test script directly relative to a web client. Such a test script may instruct the web client to activate or select specified user interface elements within a graphical user interface that is presented to the web client (e.g., as a web page rendered by an Internet browser application). These activations and/or selections can cause the web client to send various requests to one or more applications executing on an application server.

Testing becomes more complicated in a multi-tenant system that allows installation components to be shared. Because one tenant's installation may share components with another tenant's installation, an error existing in any of these components can inappropriately permit one tenant's installation to influence another tenant's installation. For example, an error in a component might permit one tenant's application to read data that is stored in a database segment that is devoted to another tenant—an activity that should be forbidden.

Even if sufficient to reveal errors existing within each tenant's own installation, separately executing the same set of tests repeatedly relative to each tenant's installation might not be sufficient to reveal errors that may arise from cross-contamination between separate tenants' installations. A test script designed to reveal errors existing within a single installation is not necessarily designed to reveal errors that might arise due to such cross-contamination, and so separate execution of such a test script relative to each tenant's installation might not be sufficient to reveal all errors.

Furthermore, a test script that is designed to reveal errors relative only to a single tenant installation sometimes might not function properly in an environment in which multiple tenants' installations share components. For example, under circumstances in which no user is permitted to have the same name as another user, a test that changes one tenant's user's name from X to Y in a single tenant environment might produce a false-positive error in a multi-tenant environment if another tenant's database segment already indicates the existence of a user with name Y.

A test suite can involve thousands of different test scripts, each of which can be executed relative to an installation in any of the ways discussed above. Considerable time and effort might go into the construction of each test script. Such test suites, designed to test installations that do not involve shared components, have already been developed. Given the pre-existence and usefulness of these test suites, the re-use of these test suites relative to installations that do involve shared components would save considerable time and money. If test suites designed to test installations that do not involve shared components could be adapted to test installations that do involve shared components, then new and different test suites would not need to be constructed to test installations of the latter type.

Multi-Tenant Testing Adapter

According to some embodiments, an adapter automatically adapts test scripts that are designed to test single installations, in which components are not shared by different tenants' installations, to execute relative to installations in which components (e.g., application server, database, etc.) are shared by different tenants' installations. Such test scripts might have been recorded from user interaction with a web client that interacts with a single installation, for example. For each tenant's installation in a set of different tenant's installations, the adapter can execute a test script relative to that tenant's installation concurrently with the adapter's execution of that test script relative to each other tenant's installation in the set. During the parallel executions of the test script relative to the installations, the adapter can translate at least some of the data from each test script execution in a manner that is specific to the tenant installation targeted by that test script execution. This translation can make the origin of each item of data originating from any test script execution more apparent, as the data may differ at least slightly between executions. The results of testing can be checked to ensure that data originating from a test script execution targeting one tenant's installation has not contaminated another tenant's installation.

In some embodiments, the adapter receives a test script as input. The adapter concurrently executes the test script for each tenant's installation. For each test script execution, the adapter can automatically translate at least some of the values that the test script execution reads from or writes to a database. The adapter can perform this translation by appending, to a value specified in the test script, a unique identifier of a tenant whose installation the test script execution targets. For example, each tenant in a set of tenants can be associated with a different numerical identifier. If a particular tenant's numerical identifier is 2, then the adapter might automatically translate each instance of a string value such as "clerk" to be "clerk2" instead, within the scope of the test script execution that targets the particular tenant's installation.

In some embodiments, rather than translating all values within the scope of a test script execution, the adapter translates only user-selected values. In such embodiments, the adapter recognizes special symbol patterns, or "decorations," that a user can insert into the original test script in association with user-selected values. In translating the test script for different tenants' installations, the adapter can translate (in a manner discussed above) each value that has been so decorated, while leaving other values the same as they were in the original test script. A decoration can additionally specify how the adapter is to modify an associated value, such as by appending user-specified, decoration-specific strings to that value. Alternatively, a decoration can expressly specify that the adapter is to modify the associated value using an adapter-selected tenant identifier for the tenant whose installation the test script execution targets, where such a tenant identifier varies between the parallel test script executions.

In translating a test script for a particular test script execution, the adapter might not only translate the values that are read from and/or written to a database, but may also translate the values that the test script checks to validate that the test was successful. For example, if an original test script determines whether a particular user interface element, such as a text box, contains the value "clerk," and if the adapter has translated values of "clerk" specified in the test script to be "clerk2" in a test script execution, then the adapter can also translate the test script execution to determine whether the particular user interface contains the value "clerk2" rather than "clerk." For another example, if an original test script determines whether a particular location in volatile memory contains the value "clerk," and if the adapter has translated values of "clerk" in the test script to be "clerk3" in a test script execution, then the adapter can also translate the test script execution to determine whether the particular memory location contains the value "clerk3" rather than "clerk."

Prior to executing the test script in parallel relative to separate tenants' installations, the adapter can initialize the data for each installation to ensure that the initial state of the data for each installation is equivalent, excepting for adjustments made in accordance with the translation of values for test script executions as described above. For example, if a first test script execution will initially write a value "clerk1" from a memory location to a first instance of an employee database table in a first tenant's installation, and if a second test script execution will initially write a value "clerk2" from a memory location to a second instance of the employee database table in a second tenant's installation, then the adapter can initialize the memory location for the first tenant's installation to contain value "clerk1," while the adapter can initialize the memory location for the second tenant's installation to contain value "clerk2." Initialization can involve creating separate database segments (possibly within the same shared database) for each tenant's installation. Initialization also can involve creating separate interfaces to a shared application server for each tenant's installation. Generally, the initialization establishes a consistent (though possibly not identical) data state for each tenant prior to the commencement of testing.

In some embodiments, the adapter can maintain a mapping between (a) a tenant identifier, (b) the original values from the original test script, and (c) the corresponding translated values in a test script execution that targets the installation of the tenant having the tenant identifier. The adapter can maintain such a mapping for each tenant whose installation a test script execution targets. The test system can query the adapter to determine the translated value that the test system is to be checking to validate whether the test was successful. For example, in response to receiving, from the test system, a combination of a tenant identifier and an original test script-specified value, the adapter can return the corresponding translated value that is mapped to that combination.

In some embodiments, in order to cause the adapter to perform the operations discussed above relative to a test script, a test script can be modified (e.g., by a user) prior to execution to include a statement that indicates that the test script is to be executed using the adapter. In response to reading such a statement in the test script, the adapter determines whether the test system's environment is a single-tenant or a multi-tenant environment. If the adapter determines that the environment is a multi-tenant environment, then the adapter performs translation relative to multiple test script executions as described above. JUnit can be used as the test system. JUnit is a unit testing framework for the JAVA programming language.

An adapter can automatically determine whether the test environment is a single-tenant environment or a multi-tenant environment by examining properties of a virtual machine that is executing the process (e.g., an application server process) that is the target of the test script that the adapter is going to execute.

Synchronization of Concurrent Test Script Executions

An adapter as described above can execute within a virtual machine. In order to execute copies of a test script concurrently relative to different tenants' installations, the adapter can instruct the virtual machine to spawn a separate thread of execution for each tenant's installation. The virtual machine can then execute these threads in parallel.

However, no guarantee is naturally provided by the virtual machine that each of the threads will be processed at the same rate. In many circumstances, there is no need for a virtual machine to ensure that all of a process' threads will execute at precisely the same rate. The extent of processing resources that the virtual machine will devote to each thread within any given time interval is not predictable. There is no guarantee provided by the virtual machine that at any given time each of the threads will have executed to approximately the same point. Left in its natural state, it is possible that the virtual machine might almost completely execute one thread targeting one tenant's installation while having executed very little of another thread targeting another tenant's installation. The fact that the virtual machine begins to execute all of the threads at the same time does not imply that the execution of all of the threads will complete at the same time.

A test script might contain several sections. For example, a test script might first contain a setup section in which an application is caused to initialize volatile memory with specified values. The test script might follow the setup section with a write section in which the application is caused to write one or more of those values to a database. The test script might follow the write section with a read section in which the application is caused to read one or more values from the database (possibly values that the application previously wrote to the database) into volatile memory. The test script might follow the read section with a verify section in which the test system is caused to determine whether values that the application read into volatile memory match expected values specified in the test script.

In such a test script, a critical point may exist at the boundary of the write and read sections. At such a critical point, a flaw in an installation component might allow one tenant's installation to influence another tenant's installation. In order to reveal whether such a flaw exists, a user of a pre-existing test script (potentially designed originally to execute relative to a single installation) might wish to ensure that the virtual machine will have performed all of the test script executions to the critical point before the virtual machine permits any of the test script executions to proceed beyond that critical point.

The adapter is not necessarily capable of determining automatically where these critical points may exist within a test script. Therefore, in some embodiments, the adapter is configured to recognize specific synchronization instructions that a user of a test script can insert into the original test script at critical points of which the user is aware. These synchronization instructions are carried over into each test script execution. In such embodiments, when any of the concurrently executing threads reads such a synchronization instruction during its execution of the test script, that thread blocks and waits—proceeding no further in the execution of that test script—until it receives a signal from the virtual machine that all of the concurrently executing threads are blocked and waiting. In response to receiving that signal, each of the blocked threads ceases blocking and resumes execution. The blocking and resumption can be implemented through a barrier. In this manner, the test script executions can be synchronized at user-specified critical points.

Example Multi-Tenant Test System Including Adapter

FIG. 1 is a block diagram that illustrates an example of a test system that includes an adapter for adapting test scripts designed for single installations to execute relative to multiple tenant installations, according to some embodiments. Such multiple tenant installations can occur within a cloud computing environment of the kind described herein, for example. Although certain components are illustrated as being connected in a certain manner, some embodiments can involve more, fewer, or different components being connected in a potentially different manner.

A customer web client 104 and a customer web client 106 are communicatively coupled to the Internet 102. Customer web client 104 might be operated by a first customer, while customer web client 106 might be operated by a second customer. The first and second customers might not have any relation to or even knowledge of each other. Through Internet 102, customer web clients 104 and 106 interact with applications executing on an application server 108.

Application server 108 can execute within a virtual machine. Application server 108 includes base logic 110 that can be utilized by multiple applications that execute on application server 108. Such applications include application 112 and application 114. In some embodiments, applications 112 and 114 are multi-tenant applications that can be shared by multiple customers while maintaining isolation between the data of those customers. Applications 112 and 114 can receive requests from customer web clients 104 and 106. Applications 112 and 114 can generate responses to such requests and can return such responses to customer web clients 104 and 106 through Internet 102.

Application server 108 is communicatively coupled to a database 116. Database 116 can include multiple separate database segments, with each segment devoted to a different customer. For example, database segment 118 can be devoted to the first customer discussed above, while database segment 120 can be devoted to the second customer discussed above. Applications 112 and 114 can read data from and write data to various ones of database segments 118 and 120 as part of processing various requests from and generating various responses to customer web clients 104 and 106. In some embodiments, only data in database segment 118 is read and written in conjunction with requests and responses from customer web client 104, and only data in database segment 120 is read and written in conjunction with requests and responses from customer web client 106.

Test modules include a web test module 124 and an application programming interface (API) test module 126. Web test module 124 is designed to simulate a customer web client's operations by interacting automatically with user interface elements of a user interface in a web page rendered by an Internet browser application in the same way that a user of a customer web client might. Such a web page may be returned by an application such as application 112 or 114, for example. Web test module 124 is also designed to read values presented within such user interface elements at different specified moments.

In contrast, API test module 126 is designed to interact more directly with applications 112 and 114 by invoking methods of APIs exposed by those applications. API test module 126 can interact with applications 112 and 114 by invoking such methods with specified parameters and receiving return values generated by the invocations of those methods.

Both web test module 124 and API test module 126 can follow a test script in performing operations that cause them to interact with applications 112 and 114. For example, such a test script can instruct web test module 124 to write a specified value to a specified user interface element. For another example, such a test script can instruct web test module 124 to read a value from a specified user interface element and to compare that value to an expected value. For another example, such a test script can instruct API test module 126 to invoke a specified method of an API exposed by an application and to compare a value returned by the method invocation to an expected value.

As is discussed above, such test scripts originally might have been designed to execute in the context of a single installation rather than in the context of multiple separate tenant's installations. An adapter 122 is communicatively coupled to both web test module 124 and to API test module 126. Adapter 122 is further communicatively coupled to application server 108. Adapter 122 can execute a test script relative to multiple separate tenant's, or customer's, installations concurrently. For example, the first customer's installation might involve database segment 118 (and no other database segments), while a second customer's installation might involve database segment 120 (and no other database segments). Adapter 122 can execute the test script relative to the first customer's installation in parallel with executing the test script relative to the second customer's installation.

Adapter 122 can translate values in each test script execution in order to customize that execution to the installation that the execution targets. For example, adapter 122 can translate a "clerk" value in a first test script execution targeting the first customer's installation to become "clerk1." Continuing the example, adapter 122 can translate the "clerk" value in a second test script execution (of the same test script) targeting the second customer's installation to become "clerk2." If the "clerk1" value ends up in the second customer's installation (e.g., in database segment 120), or if the "clerk2" value ends up in the first customer's installation (e.g., in database segment 118), such an error can suggest that a flaw in some component of an installation has compromised isolation between tenants.

Example Initialization Technique

Figure 2:
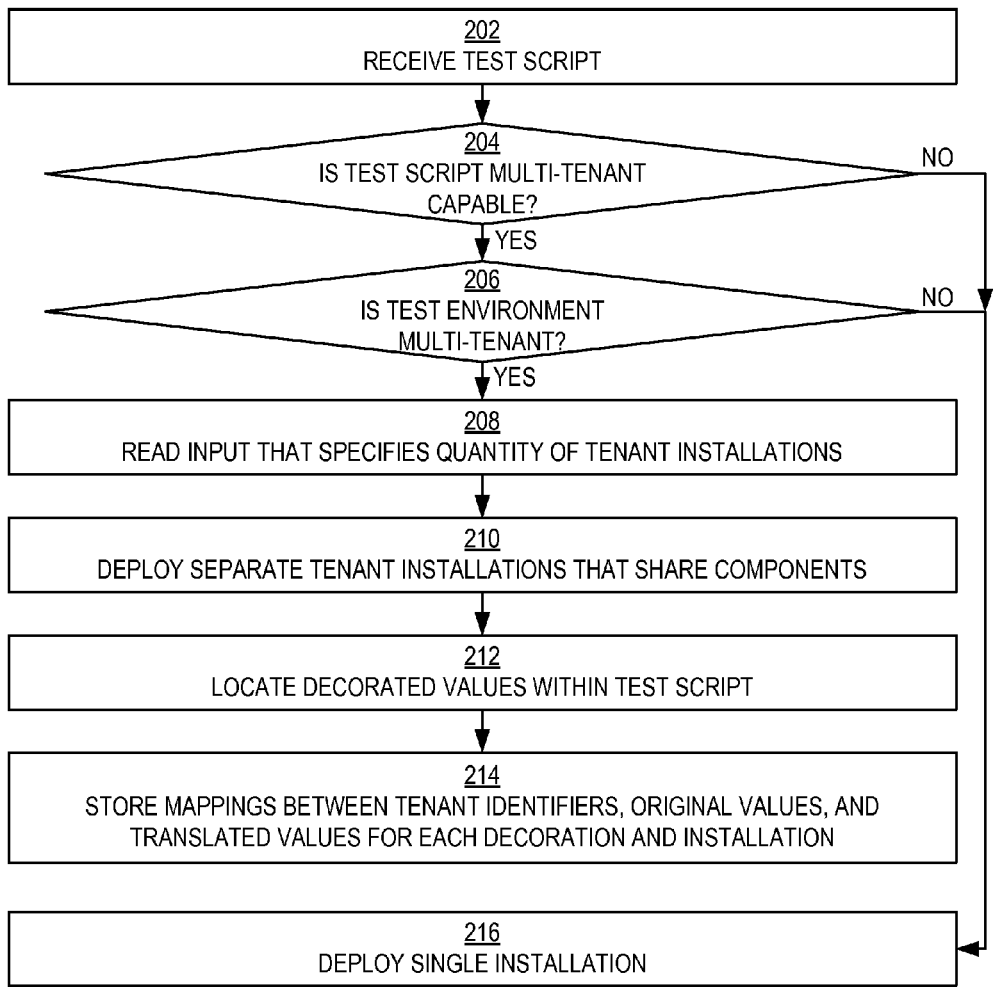
FIG. 2 is a flow diagram that illustrates an example of a technique by which an adapter can initialize one or more installations appropriate to single or multiple tenant installation environments, according to some embodiments.

FIG. 2 is a flow diagram that illustrates an example of a technique by which an adapter can initialize one or more installations appropriate to single or multiple tenant installation environments, according to some embodiments. Although certain operations are illustrated as being performed in a certain order, some embodiments can involve more, fewer, or different operations being performed in a potentially different order.

In block 202, an adapter receives a test script. In block 204, the adapter determines, from the presence or absence of a statement within the test script, whether the test script is multi-tenant capable. If the adapter determines that the test script is multi-tenant capable, then the adapter makes a subsequent determination in block 206. Otherwise, the adapter initializes a single installation in block 216.

In block 206, in response to a determination that the test script is multi-tenant capable, the adapter determines whether the test environment is a single-tenant environment or a multi-tenant environment. For example, the adapter can make this determination by examining properties of a virtual machine that is executing the process (e.g., an application server process) that is the target of the test script that the adapter is going to execute. If the adapter determines that the test environment is a multi-tenant environment, then the adapter determines a quantity of tenant installations relative to which the test script is to be executed in block 208. Otherwise, the adapter initializes a single installation in block 216.

In block 208, in response to a determination that the test environment is a multi-tenant environment, the adapter reads input that specifies a quantity of tenant installations. In block 210, for each tenant installation specified in the quantity, the adapter causes a separate tenant installation to be deployed within a cloud computing environment. The deployment can include deploying one or more application instances on an application server that is shared by the tenant installations. One or more of the application instances can be multi-tenant capable. The deployment can include creating a separate database segment, associated with its own database connection parameters, for each of the tenant installations. Each database segment can be created in a database that is shared by the tenant installations.

In block 212, the adapter locates decorated values within the test script. In block 214, for each decorated value, and for each tenant installation, the adapter stores a mapping between (a) a tenant identifier for the tenant installation, (b) an original value for the decorated value, and (c) a translated value that the adapter can generate based on the tenant identifier and the original value. For example, the adapter can generate a translated value for a decorated value by appending the tenant identifier to the original value for the decorated value. Initialization then concludes, potentially followed by parallel execution of the test script relative to each tenant installation, as described in greater detail below in relation to FIG. 3.

Alternatively, in block 216, in response to either a determination that the test script is not multi-tenant capable or a determination that the test environment is not a multi-tenant environment, the adapter causes a single installation to be deployed within a cloud computing environment. The deployment can include deploying one or more application instances on an application server that is devoted exclusively to the installation. The deployment can include creating a single database segment for each the installation in a database that is devoted exclusively to the installation. Other, completely separate and unrelated installations with their own devoted application servers and databases may also be present within the cloud computing environment. Initialization then concludes, potentially followed by execution of the test script relative to the installation.

Example Parallel Execution, Translation, and Synchronization Technique

Figure 3:
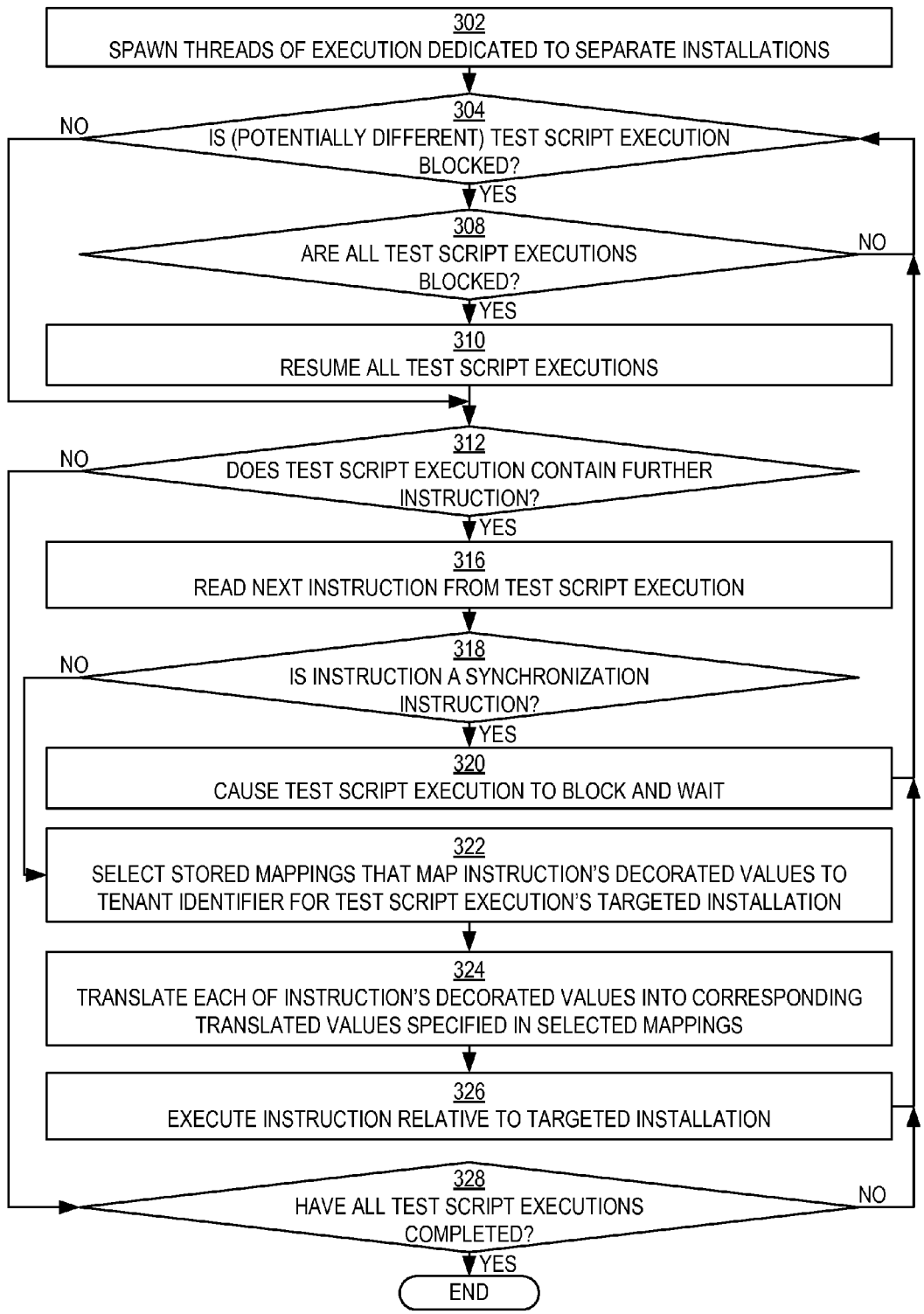
FIG. 3 is a flow diagram that illustrates an example of a technique by which an adapter can execute a test script in parallel relative to multiple tenant installations while performing tenant-specific translation within each test script execution, and while synchronizing the test script executions at specified points, according to some embodiments.

FIG. 3 is a flow diagram that illustrates an example of a technique by which an adapter can execute a test script in parallel relative to multiple tenant installations while performing tenant-specific translation within each test script execution, and while synchronizing the test script executions at specified points, according to some embodiments. Although certain operations are illustrated as being performed in a certain order, some embodiments can involve more, fewer, or different operations being performed in a potentially different order. The technique illustrated in FIG. 3 may be performed following the performance of an initialization technique, an example of which is described above in relation to FIG. 2.

In block 302, for each particular tenant installation of a plurality of tenant installations, an adapter causes a separate thread of execution dedicated to that particular tenant installation to be spawned. Each thread of execution executes a (same) specified test script relative to a separate tenant installation in the plurality of tenant installations. Thus, the threads begin to execute the test script in parallel relative to the tenant installations. Each test script execution targets a separate tenant installation.

The test script execution to which blocks 304-328 apply can potentially differ in each iteration of the performance of the operations of those blocks. In block 304, the adapter determines whether a test script execution (potentially selected by a virtual machine) is currently blocked and waiting. If the test script execution is currently blocked and waiting, then the adapter determines whether all of the test script executions are blocked and waiting in block 308. Otherwise, the adapter determines whether the test script execution contains any further instructions in block 312.

In block 308, in response to a determination that the test script execution is currently blocked and waiting, the adapter determines whether all of the test script executions are blocked and waiting. If all of the test script executions are blocked and waiting, then the adapter causes all of the test script executions to resume in block 310. Otherwise, the adapter attends to a potentially different test script execution back in block 304.

In block 310, in response to a determination that all of the test script executions are blocked and waiting, the adapter causes all of the test script executions to resume. As a result, none of the test script executions remain blocked and waiting. The adapter then determines whether the test script execution contains any further instructions in block 312.

In block 312, the adapter determines whether the test script execution contains any further instructions. If the test script execution contains a further instruction, then the adapter reads a next instruction from the test script execution in block 316. Otherwise, the test script execution has completed, and the adapter determines whether all of the test script executions have completed in block 328.

In block 316, in response to a determination that the test script execution contains at least one further instruction, the adapter reads a next instruction from the test script execution. In block 318, the adapter determines whether the instruction is a synchronization instruction. If the instruction is a synchronization instruction, then the adapter causes the test script execution to block and wait in block 320. Otherwise, the adapter begins to translate decorated values (if any) in the instruction in block 322.

In block 320, in response to a determination that the instruction is a synchronization instruction, the adapter causes the test script execution to block and wait. The adapter then attends to a potentially different test script execution back in block 304.

Alternatively, in block 322, in response to a determination that the instruction is not a synchronization instruction, for each decorated value (if any) in the instruction, the adapter selects, from a set of stored mappings (such as might have been generated in block 214 of FIG. 2) a stored mapping that maps (a) the tenant identifier for the installation that the test script execution targets to (b) the original value for the decorated value.

In block 324, for each decorated value (if any) in the instruction, the adapter translates the original value for that decorated value to a translated value specified in the stored mapping selected for that decorated value.

In block 326, the adapter causes the instruction to be executed relative to the tenant installation that the test script execution targets. The adapter then attends to a potentially different test script execution back in block 304.

Alternatively, in block 328, in response to a determination that the test script execution contains no further instructions, and therefore that the test script execution has completed, the adapter determines whether all of the test script executions have completed. If all of the test script executions have completed, then the technique illustrated in FIG. 3 concludes with regard to the test script. Otherwise, the adapter attends to a different test script execution back in block 304.

Hardware Overview

Figure 4:
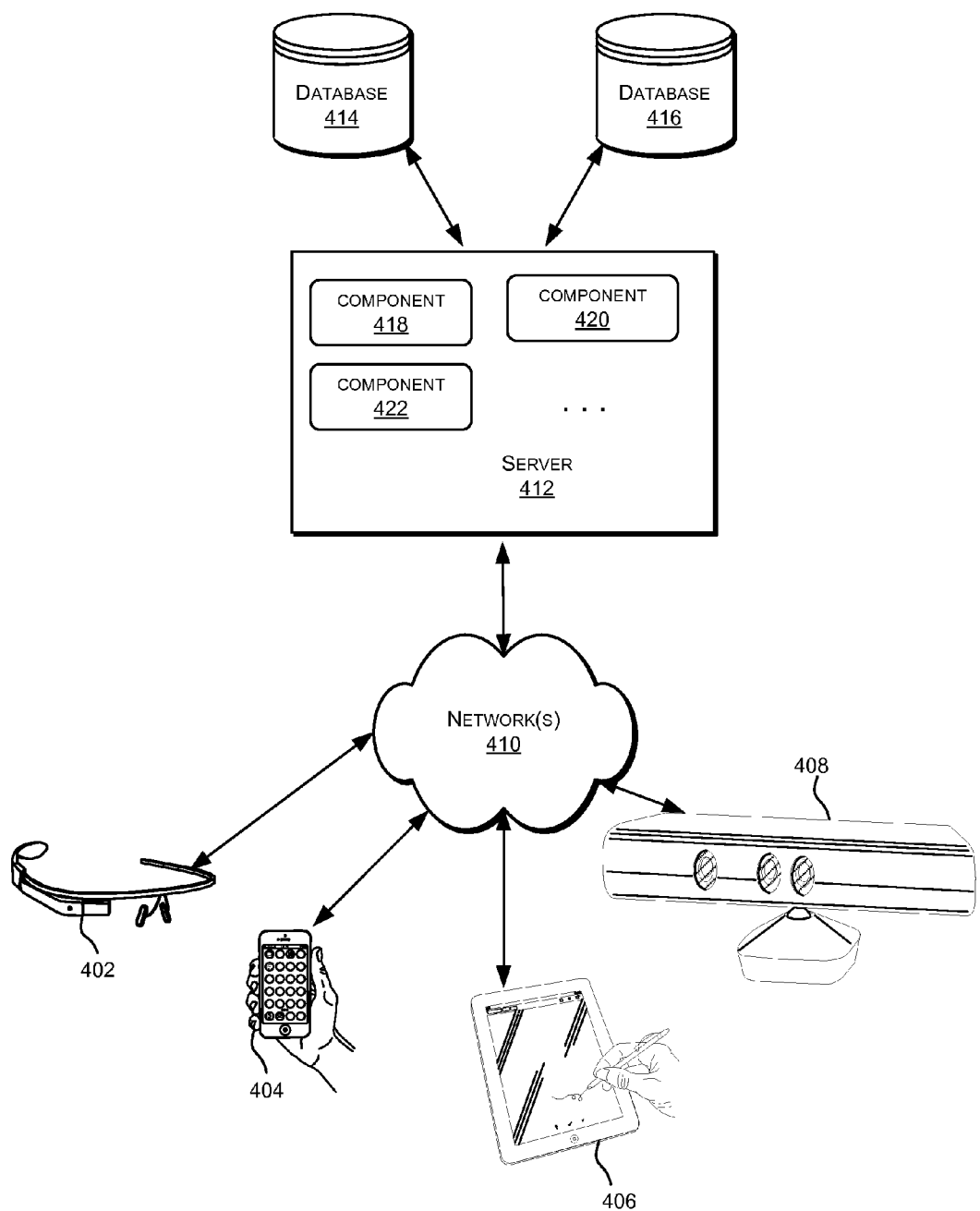
FIG. 4 depicts a simplified diagram of a distributed system for implementing one of the embodiments.

FIG. 4 depicts a simplified diagram of a distributed system 400 for implementing one of the embodiments. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications provided by one or more of the components of the system. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in the figure, the software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in the figure is thus one example of a distributed system for implementing an embodiment system and is not intended to be limiting.

Client computing devices 402, 404, 406, and/or 408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 5, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 402, 404, 406, and 408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 410.

Although exemplary distributed system 400 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), such as one based on Ethernet, Token-Ring and/or the like. Network(s) 410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 402.11 suite of protocols, Bluetooth®, and/or any other wireless protocol); and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to a server for performing processing described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, which are adapted to store, update, and retrieve data in response to SQL-formatted commands.

Figure 5:
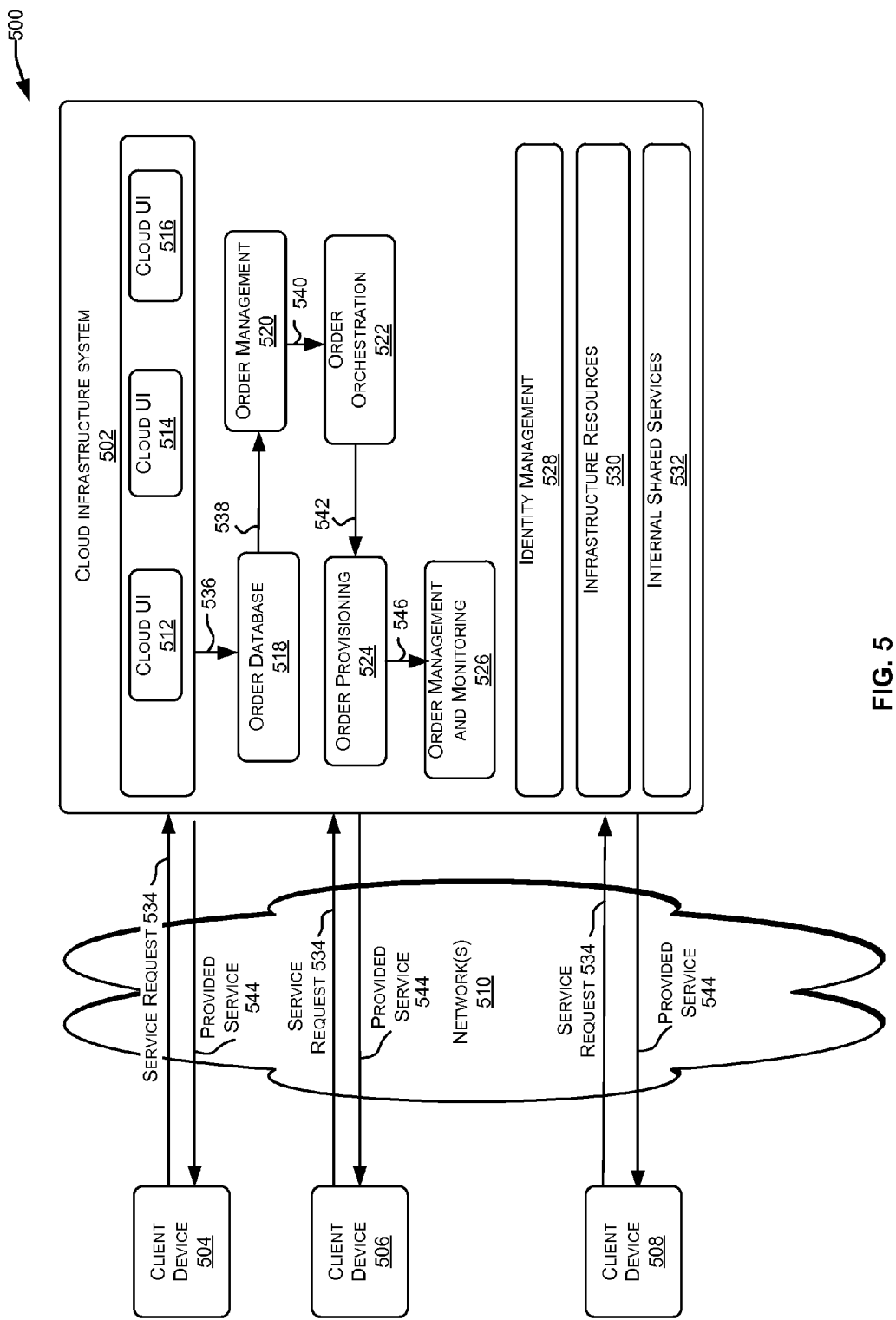
FIG. 5 is a simplified block diagram of one or more components of a system environment by which services provided by one or more components of an embodiment system may be offered as cloud services, in accordance with an embodiment of the present disclosure.

FIG. 5 is a simplified block diagram of one or more components of a system environment 500 by which services provided by one or more components of an embodiment system may be offered as cloud services, in accordance with an embodiment of the present disclosure. In the illustrated embodiment, system environment 500 includes one or more client computing devices 504, 506, and 508 that may be used by users to interact with a cloud infrastructure system 502 that provides cloud services. The client computing devices may be configured to operate a client application such as a web browser, a proprietary client application (e.g., Oracle Forms), or some other application, which may be used by a user of the client computing device to interact with cloud infrastructure system 502 to use services provided by cloud infrastructure system 502.

It should be appreciated that cloud infrastructure system 502 depicted in the figure may have other components than those depicted. Further, the embodiment shown in the figure is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408.

Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 410.

Cloud infrastructure system 502 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform.

In some embodiments, resources in cloud infrastructure system 502 may be shared by multiple users and dynamically re-allocated per demand. Additionally, resources may be allocated to users in different time zones. For example, cloud infrastructure system 530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 and by the services provided by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in the figure, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In exemplary operation 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI), cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

After an order has been placed by the customer, the order information is received via the cloud UIs, 512, 514 and/or 516.

At operation 536, the order is stored in order database 518. Order database 518 can be one of several databases operated by cloud infrastructure system 518 and operated in conjunction with other system elements.

At operation 538, the order information is forwarded to an order management module 520. In some instances, order management module 520 may be configured to perform billing and accounting functions related to the order, such as verifying the order, and upon verification, booking the order.

At operation 540, information regarding the order is communicated to an order orchestration module 522. Order orchestration module 522 may utilize the order information to orchestrate the provisioning of services and resources for the order placed by the customer. In some instances, order orchestration module 522 may orchestrate the provisioning of resources to support the subscribed services using the services of order provisioning module 524.

In certain embodiments, order orchestration module 522 enables the management of business processes associated with each order and applies business logic to determine whether an order should proceed to provisioning. At operation 542, upon receiving an order for a new subscription, order orchestration module 522 sends a request to order provisioning module 524 to allocate resources and configure those resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. Order orchestration module 522 may thus be isolated from implementation details, such as whether or not services and resources are actually provisioned on the fly or pre-provisioned and only allocated/assigned upon request.

At operation 544, once the services and resources are provisioned, a notification of the provided service may be sent to customers on client devices 504, 506 and/or 508 by order provisioning module 524 of cloud infrastructure system 502.

At operation 546, the customer's subscription order may be managed and tracked by an order management and monitoring module 526. In some instances, order management and monitoring module 526 may be configured to collect usage statistics for the services in the subscription order, such as the amount of storage used, the amount data transferred, the number of users, and the amount of system up time and system down time.

In certain embodiments, cloud infrastructure system 500 may include an identity management module 528. Identity management module 528 may be configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
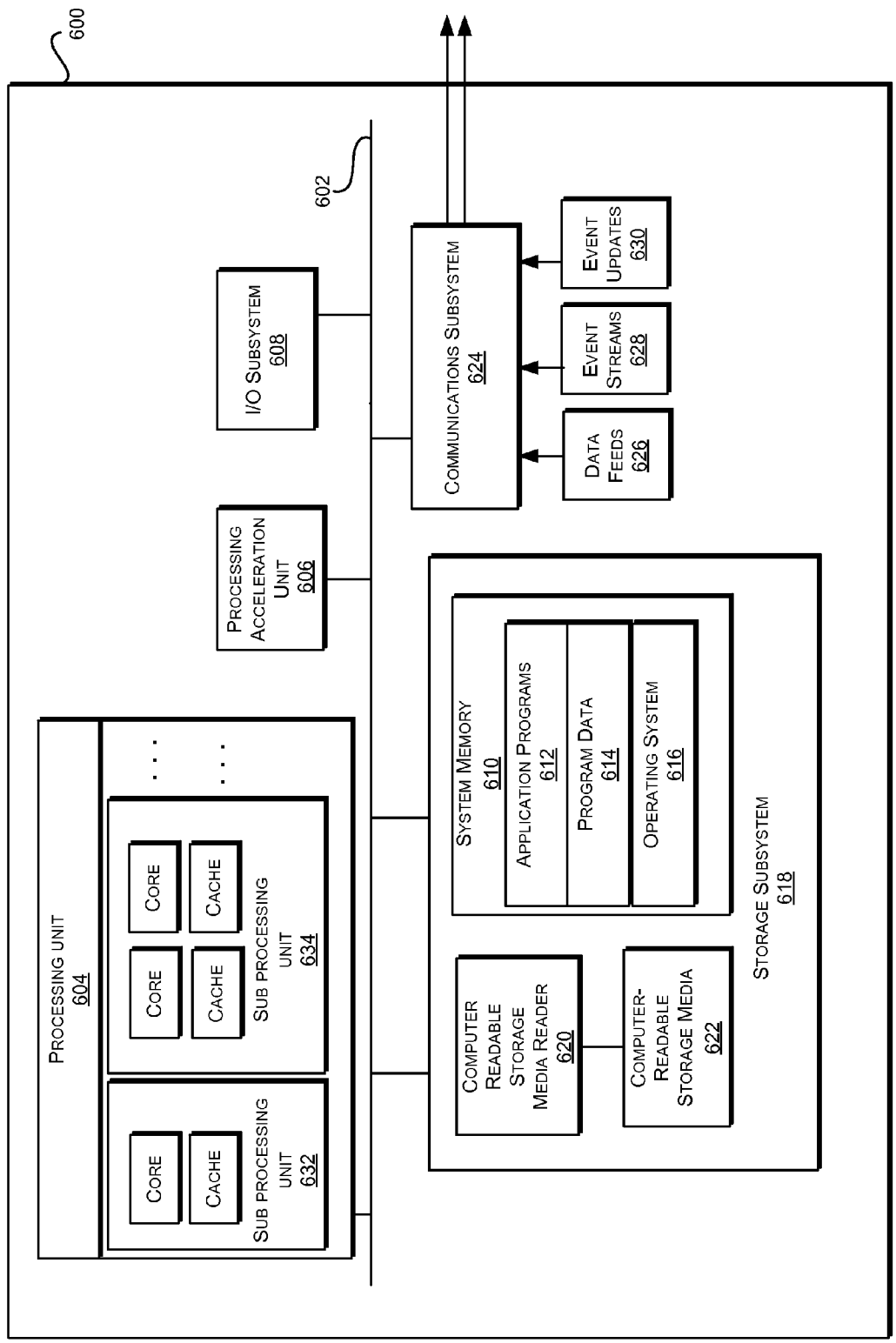
FIG. 6 illustrates an example computer system in which various embodiments of the present invention may be implemented.

FIG. 6 illustrates an example computer system 600 in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 6 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
for each particular installation of a plurality of installations, spawning a separate thread of execution to execute a test script relative to that particular installation; and
executing the threads of execution in parallel;
wherein the test script executed by each thread of execution is the same test script; and
wherein each installation of the plurality of installations shares at least one component with each other installation of the plurality of installations.

2. The method of claim 1, further comprising:
determining, based on input, a quantity of installations; and
deploying, in a cloud computing environment, installations equal in number to the quantity.

3. The method of claim 1, further comprising:
locating a decoration within the test script; and
for each particular installation of the plurality of installations, storing a mapping between an original value associated with the decoration and a translated value that differs from translated values associated with the decoration for each other installation of the plurality of installations.

4. The method of claim 3, further comprising:
for each particular installation of the plurality of installations, generating the translated value by appending an identifier of the particular installation to the original value.

5. The method of claim 1, further comprising:
reading an instruction from a first test script execution that targets a first installation of the plurality of installations;
selecting, from a plurality of stored mappings, a first mapping that maps an identifier of the first installation to an original value in the instruction; and
within the first test script execution, translating the original value in the instruction to a translated value that is specified in the first mapping.

6. The method of claim 5, further comprising:
reading the instruction from a second test script execution that targets a second installation of the plurality of installations;
selecting, from the plurality of stored mappings, a second mapping that maps an identifier of the second installation to the original value in the instruction; and
within the second test script execution, translating the original value in the instruction to a translated value that is specified in the second mapping;
wherein the second installation is separate from the first installation; and
wherein the translated values specified in the first and second mappings differ.

7. The method of claim 1, further comprising:
reading an instruction from a particular test script execution;
determining whether the instruction is a synchronization instruction;
in response to a determination that the instruction is a synchronization instruction, causing a thread of execution for the particular test script execution to block and wait until all of the threads of execution are blocked and waiting;
determining whether all of the threads of execution are blocked and waiting; and
in response to a determination that all of the threads of execution are blocked and waiting, resuming all of the threads of execution.

8. The method of claim 1, wherein:
the test script is designed to be executed relative to a single installation.

9. A non-transitory computer-readable storage medium storing code executable by one or more processors to perform operations comprising:
for each particular installation of a plurality of installations, spawning a separate thread of execution to execute a test script relative to that particular installation; and
executing the threads of execution in parallel;
wherein the test script executed by each thread of execution is the same test script; and
wherein each installation of the plurality of installations shares at least one component with each other installation of the plurality of installations.

10. The non-transitory computer-readable storage medium of claim 9, wherein the operations further comprise:
determining, based on input, a quantity of installations; and
deploying, in a cloud computing environment, installations equal in number to the quantity.

11. The non-transitory computer-readable storage medium of claim 9, wherein the operations further comprise:
locating a decoration within the test script; and
for each particular installation of the plurality of installations, storing a mapping between an original value associated with the decoration and a translated value that differs from translated values associated with the decoration for each other installation of the plurality of installations.

12. The non-transitory computer-readable storage medium of claim 11, wherein the operations further comprise:
for each particular installation of the plurality of installations, generating the translated value by appending an identifier of the particular installation to the original value.

13. The non-transitory computer-readable storage medium of claim 9, wherein the operations further comprise:
reading an instruction from a first test script execution that targets a first installation of the plurality of installations;
selecting, from a plurality of stored mappings, a first mapping that maps an identifier of the first installation to an original value in the instruction; and
within the first test script execution, translating the original value in the instruction to a translated value that is specified in the first mapping.

14. The non-transitory computer-readable storage medium of claim 13, wherein the operations further comprise:
reading the instruction from a second test script execution that targets a second installation of the plurality of installations;
selecting, from the plurality of stored mappings, a second mapping that maps an identifier of the second installation to the original value in the instruction; and
within the second test script execution, translating the original value in the instruction to a translated value that is specified in the second mapping;
wherein the second installation is separate from the first installation; and wherein the translated values specified in the first and second mappings differ.

15. The non-transitory computer-readable storage medium of claim 8, wherein the operations further comprise:
reading an instruction from a particular test script execution;
determining whether the instruction is a synchronization instruction;
in response to a determination that the instruction is a synchronization instruction, causing a thread of execution for the particular test script execution to block and wait until all of the threads of execution are blocked and waiting;
determining whether all of the threads of execution are blocked and waiting; and
in response to a determination that all of the threads of execution are blocked and waiting, resuming all of the threads of execution.

16. A system comprising:
one or more central processing units; and
a non-transitory computer-readable storage medium that stores code executable by the one or more central processing units to cause the one or more central processing units to:
spawn, for each particular installation of a plurality of installations, a separate thread of execution to execute a test script relative to that particular installation; and
execute the threads of execution in parallel;
wherein the test script executed by each thread of execution is the same test script; and
wherein each installation of the plurality of installations shares at least one component with each other installation of the plurality of installations.

17. The system of claim 16, wherein the code is executable by the one or more central processing units to cause the one or more central processing units to:
locate a decoration within the test script;
for each particular installation of the plurality of installations, store a mapping between an original value associated with the decoration and a translated value that differs from translated values associated with the decoration for each other installation of the plurality of installations; and
for each particular installation of the plurality of installations, generate the translated value by appending an identifier of the particular installation to the original value.

18. The system of claim 16, wherein the code is executable by the one or more central processing units to cause the one or more central processing units to:
read an instruction from a first test script execution that targets a first installation of the plurality of installations;
select, from a plurality of stored mappings, a first mapping that maps an identifier of the first installation to an original value in the instruction;
within the first test script execution, translate the original value in the instruction to a translated value that is specified in the first mapping;
read the instruction from a second test script execution that targets a second installation of the plurality of installations;
select, from the plurality of stored mappings, a second mapping that maps an identifier of the second installation to the original value in the instruction; and
within the second test script execution, translate the original value in the instruction to a translated value that is specified in the second mapping;
wherein the second installation is separate from the first installation; and
wherein the translated values specified in the first and second mappings differ.

19. The system of claim 16, wherein the code is executable by the one or more central processing units to cause the one or more central processing units to:
read an instruction from a particular test script execution;
determine whether the instruction is a synchronization instruction;
in response to a determination that the instruction is a synchronization instruction, cause a thread of execution for the particular test script execution to block and wait until all of the threads of execution are blocked and waiting;
determine whether all of the threads of execution are blocked and waiting; and
in response to a determination that all of the threads of execution are blocked and waiting, resume all of the threads of execution.

20. The system of claim 16, wherein:
each installation of the plurality of installations shares a database with each other installation of the plurality of installations; and
for each particular installation of the plurality of installations, the database contains a separate database segment devoted exclusively to that particular installation.

\* \* \* \* \*